(12) United States Patent
Cruickshank et al.

(10) Patent No.: US 9,793,037 B2
(45) Date of Patent: Oct. 17, 2017

(54) APPARATUS AND METHODS RELATED TO FERRITE BASED CIRCULATORS

(71) Applicant: Skyworks Solutions, Inc., Woburn, MA (US)

(72) Inventors: David Bowie Cruickshank, Rockville, MD (US); Brian Murray, Cork (IE)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/950,765

(22) Filed: Nov. 24, 2015

(65) Prior Publication Data

US 2016/0148732 A1 May 26, 2016

Related U.S. Application Data

(63) Continuation of application No. 13/463,394, filed on May 3, 2012, now Pat. No. 9,214,712.

(60) Provisional application No. 61/483,595, filed on May 6, 2011.

(51) Int. Cl.
| | |
|---|---|
| *H01P 1/387* | (2006.01) |
| *H01F 7/02* | (2006.01) |
| *H01P 1/38* | (2006.01) |
| *H01P 1/36* | (2006.01) |
| *H01P 1/39* | (2006.01) |
| *H04B 1/48* | (2006.01) |

(52) U.S. Cl.
CPC ............. *H01F 7/0273* (2013.01); *H01P 1/36* (2013.01); *H01P 1/38* (2013.01); *H01P 1/387* (2013.01); *H01P 1/39* (2013.01); *H04B 1/48* (2013.01); *H04B 2001/485* (2013.01)

(58) Field of Classification Search
CPC ........................................................ H01P 1/387
USPC ................................................. 333/1.1, 24.2
See application file for complete search history.

(56) References Cited

U.S. PATENT DOCUMENTS

| | | |
|---|---|---|
| 4,122,418 A | 10/1978 | Nagao |
| 4,390,853 A | 6/1983 | Mathew et al. |
| 4,457,464 A | 7/1984 | Forterre et al. |

(Continued)

FOREIGN PATENT DOCUMENTS

| | | |
|---|---|---|
| CN | 1661850 A | 8/2005 |
| CN | 201063356 Y | 5/2008 |

(Continued)

OTHER PUBLICATIONS

Extended European Search Report mailed on Feb. 25, 2015 in European Application No. EP12782822.6.

(Continued)

*Primary Examiner* — Stephen E Jones
(74) *Attorney, Agent, or Firm* — Knobbe, Martens, Olson & Bear LLP

(57) ABSTRACT

Apparatus and methods related to ferrite based circulators are disclosed. A ferrite disk used in a circulator can be configured to reduce intermodulation distortion when routing radio-frequency signals having closely spaced frequencies. Such a reduction in intermodulation distortion can be achieved by adjusting magnetization at the edge portion of the ferrite disk. By way of an example, a ferrite disk with a reduced saturation magnetization (4PiMs) edge portion can reduce intermodulation distortion. Example configurations with such a reduced 4PiMs edge portions are disclosed.

18 Claims, 16 Drawing Sheets

(56) References Cited

U.S. PATENT DOCUMENTS

| | | | |
|---|---|---|---|
| 4,496,915 A | 1/1985 | Mathew et al. | |
| 5,495,210 A | 2/1996 | Forterre et al. | |
| 6,130,587 A * | 10/2000 | Jun | H01P 1/387 333/1.1 |
| 6,313,713 B1 | 11/2001 | Ho et al. | |
| 6,507,249 B1 | 1/2003 | Schloemann | |
| 6,917,250 B2 | 7/2005 | Lombardi et al. | |
| 6,933,799 B1 | 8/2005 | Nukaga et al. | |
| 7,242,264 B1 | 7/2007 | How | |
| 7,683,731 B2 | 3/2010 | Kroening | |
| 7,978,018 B2 | 7/2011 | Furuta | |
| 9,214,712 B2 * | 12/2015 | Cruickshank | H01P 1/387 |
| 2009/0002090 A1 | 1/2009 | Pietig et al. | |
| 2010/0109791 A1 | 5/2010 | Lingel | |
| 2010/0127792 A1 | 5/2010 | Wada et al. | |
| 2011/0193649 A1 | 8/2011 | Popelka et al. | |

FOREIGN PATENT DOCUMENTS

| | | |
|---|---|---|
| CN | 101515663 A | 8/2009 |
| CN | 201490314 U | 5/2010 |
| CN | 201708237 U | 1/2011 |
| CN | 102187514 A | 9/2011 |
| EP | 1 083 153 A1 | 3/2001 |
| GB | 2320369 | 6/1998 |
| JP | 09-167903 | 6/1997 |
| KR | 10-2006-0085221 | 7/2006 |
| KR | 10-1007544 B1 | 1/2011 |
| WO | WO 2009/120667 A2 | 10/2009 |
| WO | WO 2012/154607 | 11/2012 |

OTHER PUBLICATIONS

European Patent Office, Extended European Search Report, mailed on Dec. 18, 2015 in European Application No. 13791473.5.

International Search Report and Written Opinion of the International Search Authority in PCT/US2012/036660 (WO 2012/154607), dated Nov. 28, 2012.

International Search Report and Written Opinion of the International Search Authority in PCT/US2013/041442, 14 pages, mailed on Dec. 4, 2013.

* cited by examiner

APPARATUS AND METHODS RELATED TO FERRITE BASED CIRCULATORS

RELATED APPLICATIONS

This application is a continuation application of U.S. application Ser. No. 13/463,394, filed May 3, 2012, which is a non-provisional of and claims priority to U.S. Provisional Application No. 61/483,595, filed on May 6, 2011, entitled "APPARATUS AND METHODOLOGIES RELATED TO FERRITE BASED CIRCULATORS," which is hereby incorporated herein by reference in its entirety.

BACKGROUND

Field

The present disclosure generally relates to circulators, and, more particularly to ferrite-based circulators configured to reduce intermodulation distortion.

Description of the Related Art

A circulator is a radio-frequency (RF) device typically having three or four ports, where RF power entering one port is routed to another port. When an RF signal is being routed between two selected ports, it can be desirable to isolate other port(s) from such a signal. Accordingly, a circulator is sometimes also referred to as an isolator. In RF applications, circulators are typically used to route to-transmit and received signals to and from an antenna. Such signals can involve different frequencies; and thus, intermodulation distortion can arise.

SUMMARY

In accordance with a number of implementations, the present disclosure relates to a passive circulator having a ferrite plate that extends laterally and having a perimeter to define a center portion and an edge portion. The center portion has a first saturation magnetization value and the edge portion having a second saturation magnetization value that is less than the first saturation magnetization value. The passive circulator further includes a magnet assembly disposed relative to the ferrite plate to provide a static magnetic field to the ferrite plate to magnetize the ferrite plate, with the magnetization configured to facilitate transmission of a radio-frequency signal between first and second locations along the perimeter of the ferrite plate based on a standing wave pattern formed in the ferrite plate due to the magnetization. The passive circulator further includes first and second electrical conductors disposed relative to the first and second locations to facilitate the transmission of the radio-frequency signal between the first and second locations.

In some embodiments, the circulator can further include a magnetic circuit for the magnet assembly, with the magnetic circuit configured to provide a return path for the magnetic field.

In a number of embodiments, the circulator can further include an inner flux conductor disposed relative to the ferrite disk and configured to provide resonator and matching network functionalities.

According to some embodiments, the circulator can further include a dielectric structure disposed along and outside of the perimeter, with the dielectric structure configured to facilitate impedance matching between the first and second electrical conductors.

According to a number of embodiments, the perimeter of the ferrite disk can have a shape such as a circular shape or a triangular shape.

Some embodiments of the passive circulator can be configured where ferrite disk is formed as a single piece disk, or includes a first piece having the first saturation magnetization value and a second piece having the second saturation magnetization value. In some of such latter configurations, the second piece of the ferrite disk can form a ring about the second piece.

According to a number of implementations, the present disclosure relates to a method for reducing intermodulation distortion. The method includes providing a ferrite medium having a first saturation magnetization to allow passage of a transmit signal between first and second locations of the ferrite medium and passage of a receive signal between the second and a third location of the ferrite medium. The method further includes providing an edge portion of the ferrite medium with a second saturation magnetization that is lower than the first saturation magnetization to reduce intermodulation distortion occurring at the edge portion of the ferrite medium.

In some implementations, the reduced intermodulation distortion can include a reduction of a third order product of fundamentals of the transmit and receive signals to a level of at least about −85 dBc. Such a reduction of the third order product can be to a level of at least about −90 dBc.

In various embodiments, the present disclosure relates to a passive circulator module for isolating transmit and receive RF signals from each other. The module includes a ferrite disk having a center and an edge, and having a first saturation magnetization value between the center and a first radius that is between the center and the edge and a second saturation magnetization value between the first radius and the edge. The module further includes a magnet assembly configured to provide a static magnetic field to the ferrite disk to magnetize the ferrite disk. The module further includes signal ports coupled to the transmit RF signal, the receive RF signal, and an antenna.

In some embodiments, the module can further include a housing configured to contain the ferrite disk, the magnet assembly, and at least a portion of the signal ports.

In some embodiments, the module can further include a dielectric ring disposed along the outside of the edge of the ferrite disk. Such a ferrite disk can be formed as a single piece disk.

In some embodiments, the module can further include a circular disk having the first radius and a circular ring having an inner diameter greater than or equal to the first radius and an outer diameter at the edge of the ferrite disk.

In accordance with a number of embodiments, the present disclosure relates to a passive ferrite based isolator for isolating transmit and receive wireless signals from each other when sharing a common antenna. The isolator has a reduced intermodulation distortion of a third order product of fundamentals of the transmit and receive signals at a level of at least about −85 dBc.

In some implementations, the present disclosure relates to a wireless device having a transmitter circuit, a receiver circuit, and an antenna configured to transmit signals from the transmitter circuit and to receive signals for the receiver circuit. The wireless device further includes a ferrite based circulator for isolating transmit and receive signals between the transmitter and receiver circuits. The circulator includes a ferrite disk having a center and an edge, and having a first saturation magnetization value between the center and a first radius that is between the center and the edge and a second saturation magnetization value between the first radius and the edge. The circulator further includes a magnet assembly configured to provide a static magnetic field to the ferrite disk to magnetize the ferrite disk. The circulator further includes signal ports coupled to the transmitter circuit, the receiver circuit, and the antenna.

In some embodiments, the wireless device can include a mobile telephone.

In some implementations, the present disclosure relates to a disk assembly for a radio-frequency circulator. The disk assembly includes a ferrite disk having a first saturation magnetization value. The disk assembly further includes a first piece dimensioned to form a perimeter around the ferrite disk, and has a second saturation magnetization value that is less than the first saturation magnetization value. The disk assembly further includes a second piece dimensioned to form a perimeter around the second piece. The second piece includes a desired dielectric material. The ferrite disk and the first and second pieces are configured to provide desired magnetization at or near an edge portion of the disk assembly.

DETAILED DESCRIPTION OF SOME EMBODIMENTS

The headings provided herein, if any, are for convenience only and do not necessarily affect the scope or meaning of the claimed invention.

In some implementations, circulators are passive devices utilized in radio-frequency (RF) applications to, for example, selectively route RF signals between an antenna, a transmitter, and a receiver. If a signal is being routed between the transmitter and the antenna, the receiver preferably should be isolated. Accordingly, a circulator is sometimes also referred to as an isolator; and such an isolating performance can represent the performance of the circulator.

Figure 1A:
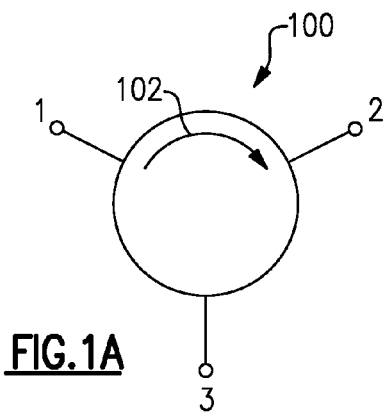
FIGS. 1A and 1B schematically depict examples of 3-port and 4-port circulators.
Figure 1B:
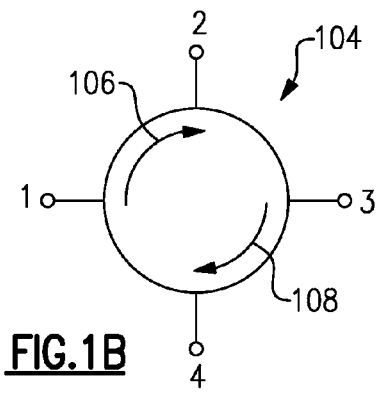

In some embodiments, a circulator can be a passive device having three or more ports (e.g., ports for antenna, transmitter and receiver). FIGS. 1A and 1B schematically show an example of a 3-port circulator 100 and a 4-port circulator 104. In the example 3-port circulator 100, a signal is shown to be routed (arrow 102) from port 1 to port 2; and port 3 can be substantially isolated from such a signal. In the example 4-port circulator 104, a signal is shown to be routed (arrow 106) from port 1 to port 2; and another signal is shown to be routed (arrow 108) from port 3 to port 4. The two junctions of the signal paths in the example of FIG. 1B can be substantially isolated from each other. Other configurations of 3 and 4-port circulators, as well as circulators having other numbers of ports, can also be implemented.

In some implementations, a circulator can be based on ferrite materials. Ferrites are magnetic materials having very high ohmic resistance. Accordingly, ferrites have little or no eddy current when subjected to changing magnetic fields, and are therefore suitable for RF applications.

Ferrites can include Weiss domains, where each domain has a net non-zero magnetization. When there is no external magnetic field influencing a ferrite object, the Weiss domains are oriented substantially randomly, so that the ferrite as a whole has a net magnetization of approximately zero.

If an external magnetic field of sufficient strength is applied to the ferrite object, the Weiss domains tend to align along the direction of the external magnetic field. Such a net magnetization can influence how an electromagnetic wave propagates within the ferrite object.

Figure 2A:
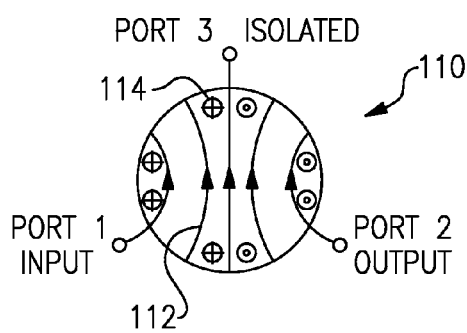
FIGS. 2A and 2B show examples of magnetic fields that can be applied to the example circulators of FIGS. 1A and 1B to achieve desired routing functionalities.
Figure 2B:
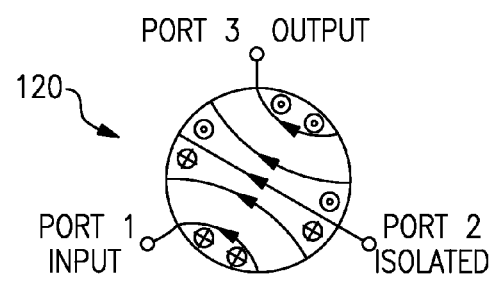

For example, and as depicted in FIGS. 2A and 2B, suppose that a circular disk shaped ferrite object 110 is subjected to a substantially static external magnetic field directed along the axis (perpendicular to the plane of paper) of the disk. In the absence of such an external field (not shown), an RF signal input into Port 1 and propagating perpendicular to the disk axis splits into two rotating waves with a substantially same propagation speed. One wave rotates clockwise around the disk, and the other counter-clockwise around the disk, so as to yield a standing wave pattern. If Ports 2 and 3 are positioned equally spaced azimuthally relative to Port 1 (about 120 degrees from each other), the standing wave pattern results in approximately half of the incoming wave leaving each of Ports 2 and 3.

In the presence of such an external magnetic field, the propagation speeds of the two rotating waves are no longer the same. Because of the difference in the propagation speeds, the resulting standing wave pattern can yield a situation where substantially all of the energy of the incoming wave is passed to one of the two ports while the other port is substantially isolated.

For example, FIG. 2A shows a configuration where the axial static magnetic field (not shown) yielding a rotated standing wave pattern relative to the incoming wave propagation direction (along Port 1). Examples of electric field lines corresponding to such a standing wave pattern are depicted as 112 (along a plane of the disk) and 114, 116 (along the axis of the disk). The example rotated standing wave pattern results in a substantial null in electric field strength at Port 3, thereby yielding substantial isolation of Port 3. On the other hand, Port 2 is depicted as having a similar (inverted) wave pattern as that of the input at Port 1, and therefore transmits energy from Port 1 to Port 2.

FIG. 2B shows another example where an axial static magnetic field (not shown) yields a rotated standing wave pattern, such that a wave input through Port 1 is passed to Port 3 as an output, and Port 2 is substantially isolated. In some implementations, the two rotated standing wave patterns can be achieved by providing magnetic fields that are higher and lower than a field value that results in a resonance in the precession of ferrite domains.

Figure 3:
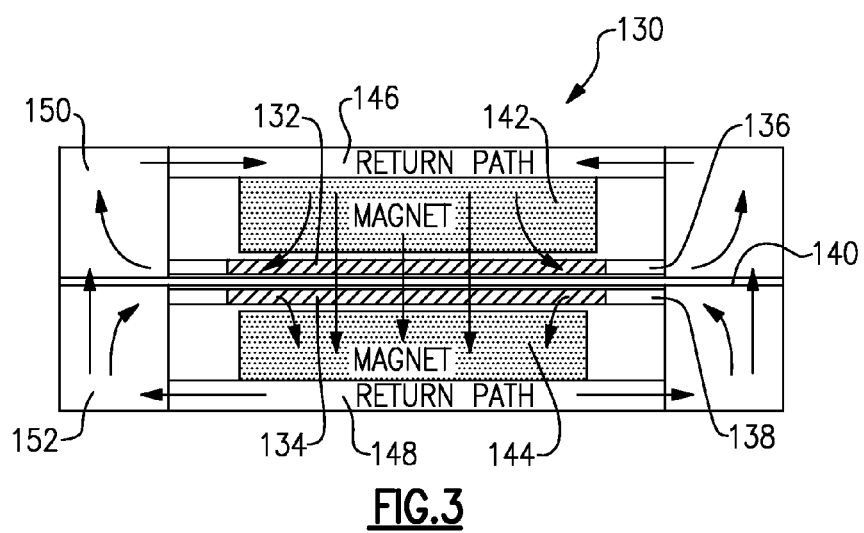
FIG. 3 shows an example circulator having a pair of ferrite disks disposed about an inner conductor and between a pair of magnets.

FIG. 3 shows an example configuration of a circulator device 130 having a pair of ferrite disks 132, 134 disposed between a pair of cylindrical magnets 142, 144. The magnets 142, 144 can be arranged so as to yield generally axial field lines through the ferrite disks 132, 134. The magnetic field flux that passes through the ferrite disks 132, 134 can complete its circuit (depicted by arrows) through return paths provided by 148, 152, 150 and 146 so as to strengthen the field applied to the ferrite disks 132, 134. In some embodiments, the return path portions 148 and 146 can be disks having a diameter larger than that of the magnets 142, 144; and the return path portions 152 and 150 can be hollow cylinders having an inner diameter that generally matches the diameter of the return path disks 148, 146. The foregoing parts of the return path can be formed as a single piece or be an assembly of a plurality of pieces.

The example circulator device 130 can further include an inner flux conductor 140 disposed between the two ferrite disks 132, 134. Such an inner conductor can be configured to function as a resonator and matching networks to the ports (not shown).

The example circulator device 130 can further include a high relative dielectric (Er) material 136, 138 disposed between the edge portion of the ferrite disks 132, 134 and the return path portions 150, 152. Such a high Er dielectric can be formed as a ring dimensioned to fit between the corresponding ferrite disk and the outer return path portion.

In some implementations, such a dielectric ring can be part of a composite ferrite/dielectric TM resonator, where the dielectric replaces some of the ferrite. A high dielectric constant material can be used to keep the diameter of the composite approximately the same as a ferrite-only resonator at a desired frequency. In some embodiments, such a dielectric material can have a dielectric constant value between about 16 and 30, but are not necessarily confined to that range. For example, a dielectric constant value as high as about 50 can also be utilized. In some implementations, such a dielectric can provide a non-magnetic gap between the ferrite and the return path magnetic field to thereby improve the IMD reduction performance over a configuration where the ferrite extends further out to the return path.

Non-limiting examples of materials that can be utilized for the various parts of the foregoing example circulator device 130 are described herein in greater detail.

Figure 4:
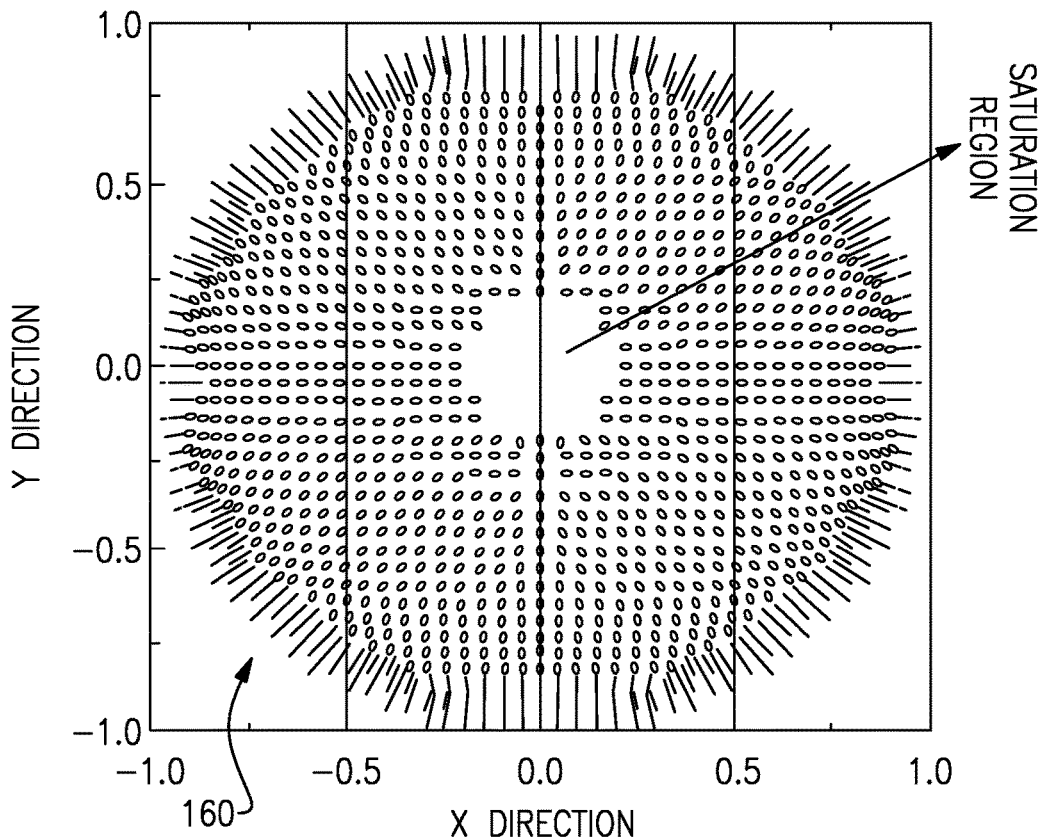
FIG. 4 shows an example of significant radial component in magnetization that can exist at or near the edge portion of the example circulator of FIG. 3.

As described herein (e.g., in reference to FIGS. 2A and 2B), a disk-based circulator generally has an intrinsically symmetrical RF field distribution in the ferrite disk. The static magnetic field, however, can change considerably at the edge portion of the ferrite disk. FIG. 4 shows such an example, where magnetization vector directions are shown for a ferrite disk subjected to a substantially uniform static magnetic field in the axial direction. As seen in the axial view (along the Z direction), the vector directions at or near the edge portion have significant radial components.

Figure 5:
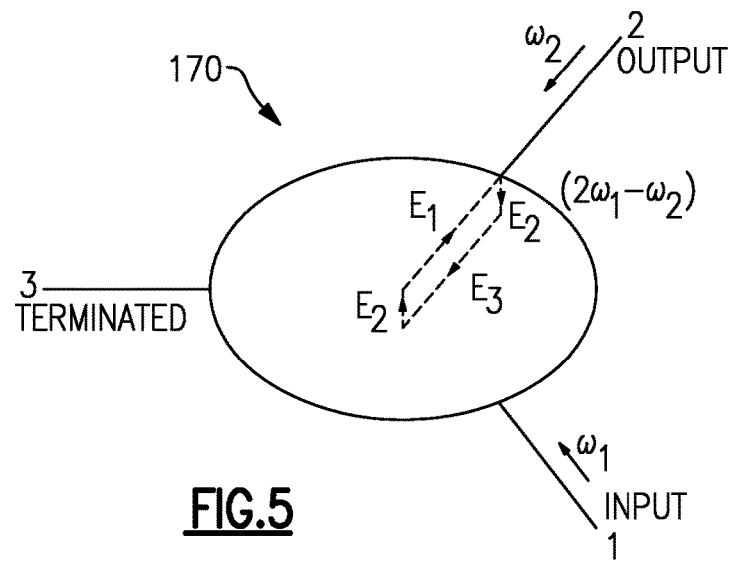
FIG. 5 shows that interactions of intermodulation signals in circulators can occur primarily at the edge portion of ferrite disks.

It has been reported that interactions of intermodulation signals in circulators occur primarily at the edge of the disks. Such an effect is depicted in FIG. 5, where a rectangular loop represents a coupling between an RF field and magnetization for an intermodulation of signals associated with an input (port 1) and an output (port 2). More particularly, such a coupling can contribute to a third order intermodulation product having a frequency $2\omega_1-\omega_2$, where $\omega_1$ and $\omega_2$ are the frequencies of the input and output signals, respectively.

In some situations, and as described herein in reference to FIG. 3, a static magnetic field can be distorted by the shape of the magnet and/or the presence of a magnetic return path in the circulator. In the example of FIG. 4, the deviation of magnetization vector directions away from the axial direction along the edge portion can be due to such a distortion.

In some situations, such a distortion can influence how well saturated the edge of a ferrite is, and hence its susceptibility to nonlinear behavior in the presence of RF fields. For example, a reduced axial field at or near the ferrite's edge portion can result in the ferrite to drop back towards the resonance absorption peak, thereby increasing the insertion loss. At low microwave frequencies relative to the ferrite's saturation magnetization (also referred to as 4πMs or 4PiMs), low field loss is also possible even above resonance.

In some situations, the foregoing nonlinear behavior can result in intermodulation distortion (IMD) resulting from two or more signals mixing within a device to produce undesirable higher-order products. These unwanted higher-order signals can fall within transmitting or receiving bands and cause interference (also referred to as intermodulation distortion).

Figure 6:
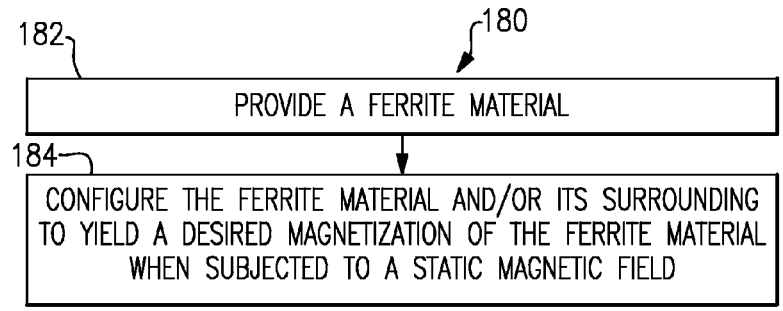
FIG. 6 shows a process that can be implemented to control magnetization of a ferrite device to reduce intermodulation distortion (IMD).

Accordingly, in some implementations, it is desirable to control the magnetization of a ferrite based device so as to reduce the amount of IMD. FIG. 6 shows a process 180 that can be implemented to achieve such a feature. In block 182, a ferrite material can be provided. In block 184, the ferrite material and/or its surrounding can be configured to yield a desired magnetization of the ferrite material when subjected to a static magnetic field.

For the purpose of description herein, a circular disk shaped ferrite material is utilized to demonstrate various features of the disclosure. It will be understood, however, that one or more features of the present disclosure can also be implemented in other shaped ferrites, including, for example, a non-circular slab such as a triangular shaped slab, as well as other non-slab shaped objects.

Figure 7:
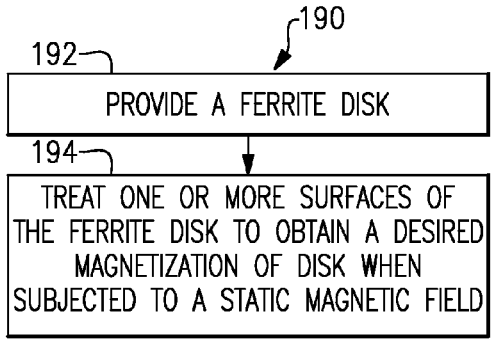
FIG. 7 shows an example process that can be implemented in the context of a circular disk shaped ferrite as a more specific example of the process of FIG. 6.

In the context of a circular disk shaped ferrite, a process 190 of FIG. 7 can be a more specific example of the process 180 of FIG. 6. In block 192, a ferrite disk can be provided. In block 194, one or more surfaces of the ferrite disk can be treated to obtain a desired magnetization when subjected to a static magnetic field. An example of such a surface treatment is described herein in greater detail.

Figure 8:
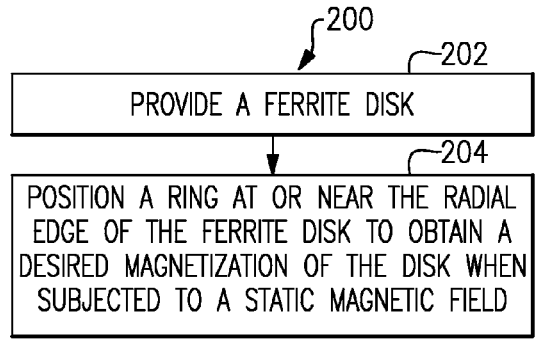
FIG. 8 shows another example process that can be implemented as a more specific example of the process of FIG. 6, where one or more structures can be positioned at or near the radial edge of the ferrite disk to obtain a desired magnetization.

In another example, a process 200 of FIG. 8 can be implemented, where in block 202, a ferrite disk can be provided. In block 204, one or more structures can be disposed at or near the radial edge of the ferrite disk to obtain a desired magnetization when subjected to a static magnetic field. An example of such a structure is described herein in greater detail.

Figure 9:
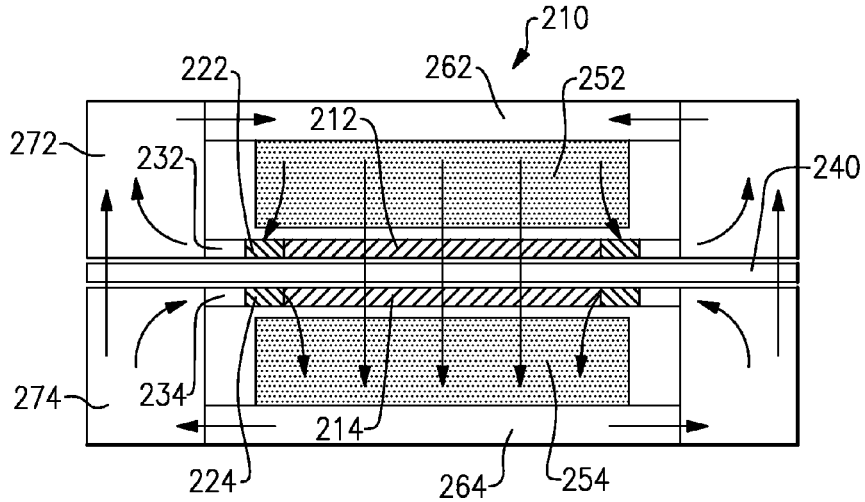
FIG. 9 shows an example configuration that can result from the process of FIG. 8.

FIG. 9 shows that in some implementations, a circulator device 210 can be configured to have one or more features that can yield a desired magnetization of one or more ferrite disks 212, 214. One or more of the ferrite disks 212, 214 can have one or more surfaces treated so as to yield or contribute to the desired magnetization.

In the circulator device 210, a pair of cylindrical magnets 252, 254 is shown to provide a static magnetic field for magnetization of the ferrite disks 212, 214. The magnetic field flux that passes through the ferrite disks 212, 214 can complete its circuit (depicted by arrows) through return paths provided by 264, 274, 272 and 262 so as to strengthen the field applied to the ferrite disks 212, 214. In some embodiments, the return path portions 264 and 262 can be disks having a diameter larger than that of the magnets 252, 254; and the return path portions 274 and 272 can be hollow cylinders having an inner diameter that generally matches the diameter of the return path disks 264, 262. The foregoing parts of the return path can be formed as a single piece or be an assembly of a plurality of pieces.

The example circulator device 210 can further include an inner flux conductor 240 disposed between the two ferrite disks 212, 214. Such an inner conductor can be configured to function as a resonator and matching networks to the ports (not shown).

The example circulator device 210 can also include a high relative dielectric (Er) material 232, 234 disposed between the edge portion of the ferrite disks 212, 214 and the return path portions 272, 274. Such high Er dielectric material 232, 234 can be formed as a ring dimensioned to fit within the inner walls of the outer return path portions 272, 274.

In some implementations, the example circulator device 210 can include structures 222, 224 disposed at or near the edge portions of the ferrite disks 212, 214. In the example shown, each of the structures 222, 224 can be a ring dimensioned to fit between the high Er dielectric ring (232 or 234) and the outer edge of the ferrite disk (212 or 214).

In some implementations, each of the rings 222, 224 can be formed from a material having a lower saturation magnetization (4PiMs) than that of the ferrite disk (212 or 214). Combined, each of the ferrite disk and the lower-4PiMs ring can yield a magnetizable disk having a reduced 4PiMs at the edge portion. As described herein, such a combination can yield a reduction in the IMD of the circulator device 210.

Table 1 lists some non-limiting examples of materials or features that can be utilized for the various parts of the circulator 210 described in reference to FIGS. 3 and 9.

TABLE 1

| Part(s) | Example Material(s) and/or Feature(s) |
|---|---|
| Magnets (142, 144 in FIG. 3; 252, 254 in FIG. 9) | Permanent magnets having field strength sufficient to yield saturation magnetization of ferrite disks when assembled. |
| Return path (148, 152, 150, 146 in FIG. 3; 264, 274, 272, 262 in FIG. 9) | Steel, which is preferable when RF signals cause large eddy currents in good conductors such as soft iron. |
| Inner conductor (140 in FIG. 3; 240 in FIG. 9) | High RF conductivity metal such as copper, brass, silver etc. |
| Ferrite disks (132, 134 in FIG. 3; 212, 214 in FIG. 9) | Yttrium iron garnet (YIG) having a 4PiMs of about 1780 Gauss (referred to as "G113" herein) or any 4PiMs greater than the ferrite rings 232, 234 |
| High Er dielectric rings (136, 138 in FIG. 3; 232, 234 in FIG. 9) | Referred to as "D30" herein. Dielectric constant value can be between about 16 and 30, or can be higher up to about 50. |
| Reduced-4PiMs rings (232, 234 in FIG. 9) | Garnet such as YIG with a low 4PiMs of about 1000 Gauss (referred to as "G1010" or "G-1210" herein) or any 4PiMs significantly lower than the ferrite disks 212, 214. |

It will be understood that a number of other types of materials and materials having different values or properties can also be used to implement one or more features of the present disclosure.

In the example described in reference to FIG. 9 and Table 1, the reduced 4PiMs at the edge portion of a ferrite disk can be provided by an addition of a ring having a lower 4PiMs value. Such a ring configuration can be an example where the ferrite disk and the ferrite ring form a ferrite assembly formed from separate pieces. In some embodiments, a single-piece ferrite structure (e.g., a disk) can also be used, where the single-piece structure has two or more regions having different 4PiMs values. For example, a center portion of a disk can have a first 4PiMs value, and an edge portion can have a second 4PiMs value that is lower than the first value.

Figure 10:
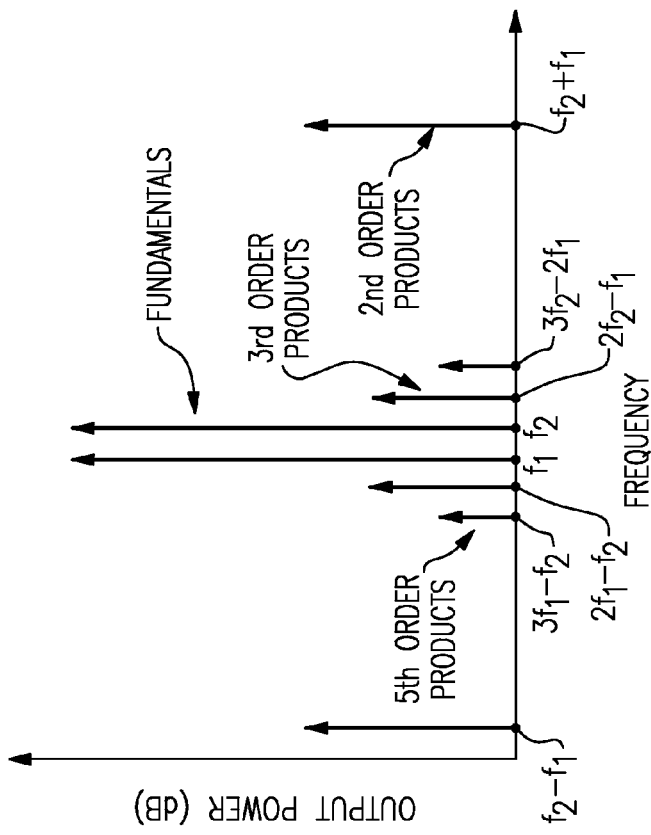
FIG. 10 shows an example of IMDs that can result from two fundamental frequencies $f_1$ and $f_2$ that are relatively close to each other in frequency space.

To demonstrate improvements in IMD isolation performance associated with one or more features of the present disclosure, Applicant measured third order products resulting from two closely spaced (in frequency) RF signals. An example of such an IMD is depicted in FIG. 10, where two fundamental frequencies $f_1$ and $f_2$ are relatively close to each other in frequency space. Odd-numbered products form relatively close to the fundamentals; and among such odd-numbered products, the third-order products are typically the most dominant, and thus of greatest concern. Such third-order products occur at frequencies centered at about $2f_1-f_2$ and $2f_2-f_1$.

Figure 11:
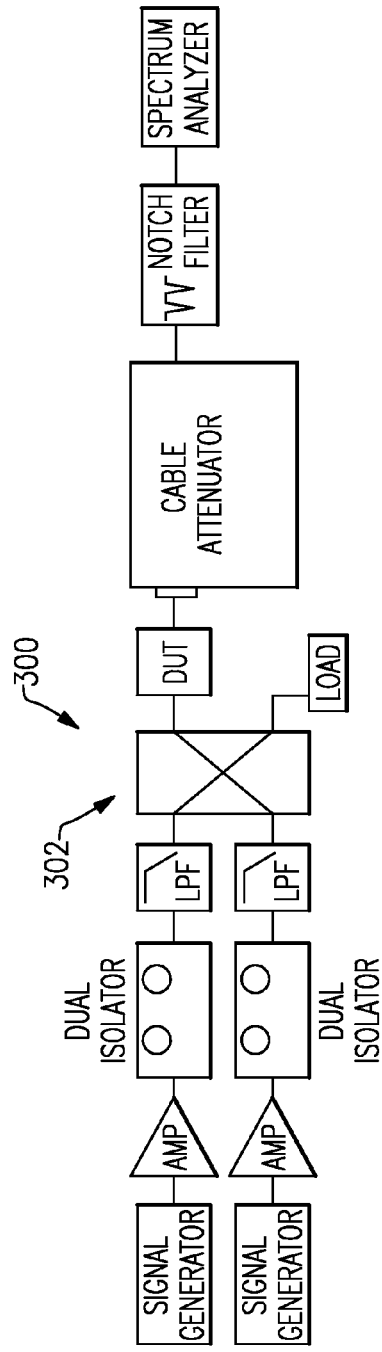
FIG. 11 shows an example test setup for generating and measuring IMDs such as those of FIG. 10.

Such IMDs can be formed and measured in a number of ways. FIG. 11 shows an example test setup 300 where various configurations of a circulator 302 can be tested. Two signal generators can generate two fundamental signals having closely spaced frequencies ($f_1$ and $f_2$). Each signal can be conditioned (e.g., amplifier, dual isolator, and low-pass filter as shown), then combined and fed into the circulator 302. An output signal can be conditioned (e.g., attenuator and notch filter as shown) and measured by, for example, a spectrum analyzer.

Figure 12:
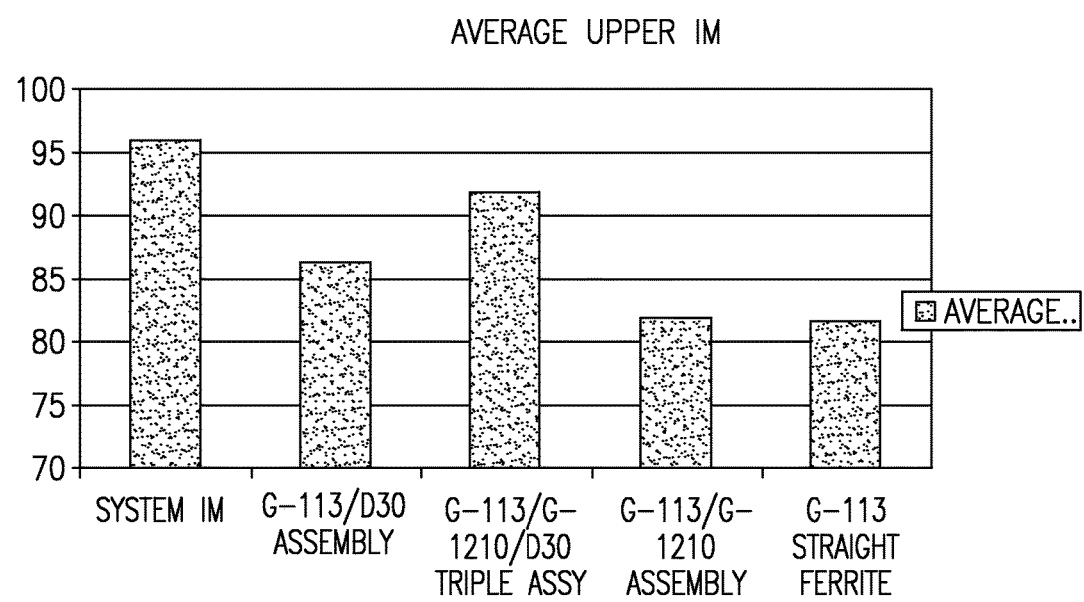
FIG. 12 shows examples of IMD measurement results.

FIG. 12 shows examples of results obtained from the foregoing investigation of the localization of the IMD effect. The vertical scale denotes amplitude in dBc. The values of the various bars shown correspond to average values of upper third-order peak amplitudes.

The right-most bar ("G-113 Straight Ferrite") is for a configuration similar to that of FIG. 3 without the dielectric rings (136, 138). Moving to the left, the bar indicated as "G-113/G-1210 Assembly" is for a configuration where a reduced 4PiMs ring (G-1210) is provided on the outside of the ferrite (G-113). The bar indicated as "G-113/G-1210/D30 Triple Assay" is for a configuration where both of the reduced 4PiMs ring (G-1210) and the dielectric ring (D30) are provided on the outside of the ferrite (G-113) (e.g., similar to FIG. 9). The bar indicated as "G-113/D30 Assembly" is for a configuration the dielectric ring (D30) is provided on the outside of the ferrite (G-113), but not G-1210 (e.g., similar to FIG. 3). The left-most bar indicated as "System IM" is representative of a detection limit of the measurement system, and can be considered to be a theoretical situation where no IMD contribution comes from the circulator/isolator.

Experiments utilizing the foregoing circulator configurations the example setup of FIG. 11 were performed at about 400 MHz and at about 900 MHz, with the fundamentals being separated by about 5 MHz. The results depicted in FIG. 12 are for the 900 MHz experiment; and following observations can be made. The presence of the low magnetization ring (in the G-113/G-1210/D30 configuration) resulted in an IMD reduction of about −92 dBc, which is an improvement of about 5 dB in IMD isolation when compared to the configuration without the low magnetization ring (G-113/D30) (about −87 dBc). Without the low magnetization ring, the presence of the dielectric ring (G-113/D30) performs better than the configuration without the dielectric ring (G-112) (about −82 dBc). Without the dielectric ring, the presence of the low magnetization ring (G-113/G-1210) appears to make very little improvement over the configuration without the low magnetization ring (G-113).

Relative to the "System IM" result (at about −97 dBc), the G-113/G-1210/D30 configuration (about −92 dBc) shows the best results among the configurations tested. When compared to the worst of the example configurations (G-113 at about −82 dBc), the improvement of about 10 dB can be realized. In some implementations, an improvement of about 20 dB or more can also be achieved.

Figure 13A:
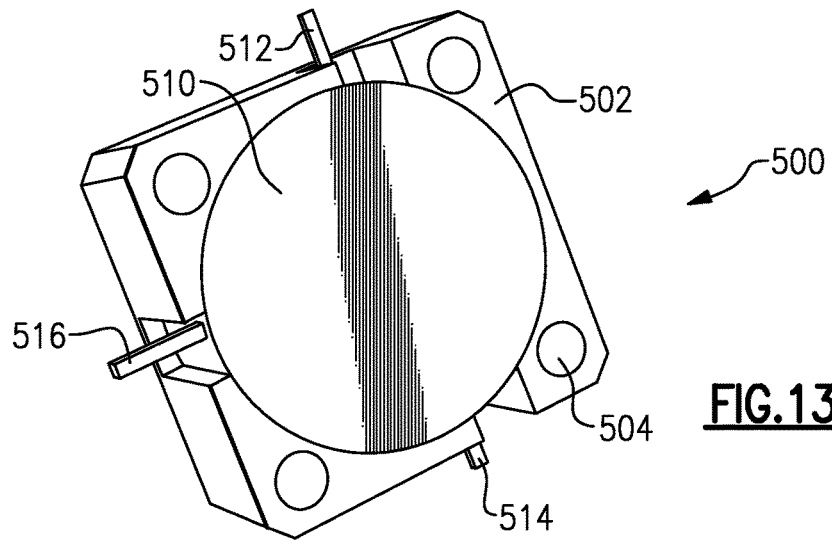
FIGS. 13A-13C show an example passive circulator device having one or more features described herein and packaged as a modular device.
Figure 13B:
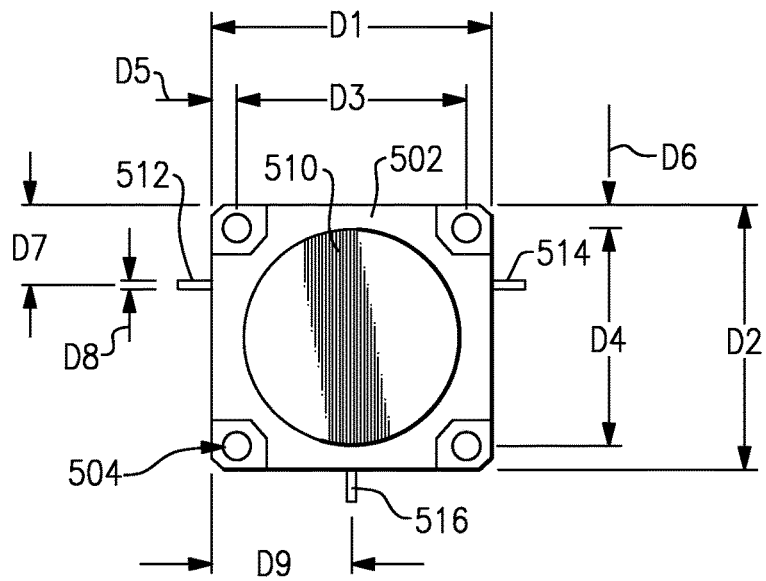
Figure 13C:
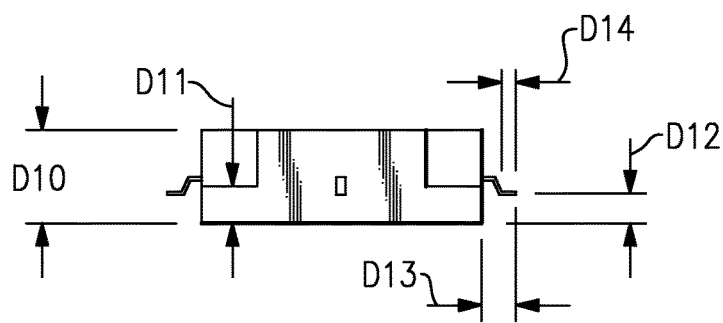

In some implementations, a passive circulator device having one or more features can be packaged as a modular device. An example of such a device is shown in FIGS. 13A-13C. A circulator module 500 can include a circulator 510 packaged in a housing 502. Such a housing 502 can be configured to facilitate mounting of the module 500, via, for example, mounting holes 504. The example circulator 510 of the module 500 is a 3-port circulator; and RF signals to and/or from the circulator 510 can be passed through electrical contacts 512, 514, 516. Various dimensions of the example circulator module 500 are listed in Table 2.

TABLE 2

| Dimension reference | Approximate dimension |
|---|---|
| D1 | 25.4 mm |
| D2 | 25.4 mm |
| D3 | 20.8 mm |
| D4 | 20.8 mm |
| D5 | 2.3 mm |
| D6 | 2.3 mm |
| D7 | 7.6 mm |
| D8 | 0.6 mm |
| D9 | 12.7 mm |
| D10 | 9.0 mm (max) |
| D11 | 3.8 mm |
| D12 | 2.8 mm |
| D13 | 3.0 mm |
| D14 | 1.3 mm |

For the purpose of description, the example single junction circulator module 500 described in reference to FIG. 13 and Table 2 is referred to as a SKYFR-000700 module. In some embodiments, the compact dimension (about 25 mm×25 mm) module 500 can be designed to operate in the GSM band of 925 MHz-960 MHz. As described herein, some configurations of the SKYFR-000700 module can achieve IMD performance of better than about −90 dBc with two CW tones of +47 dBm, spaced 5 MHz apart.

For the purpose of demonstrating such an improved IMD performance, the SKYFR-000700 module was configured with a circulator having a triple assembly similar to the configuration described herein as G-113/G-1210/D30 and having G-113 ferrite disks, reduced magnetization rings G-1210, and dielectric rings D30. For comparison, a circulator device (referred to as MFR000xxx herein) was configured with a circulator having a configuration similar to that of G113/D30 described herein.

The foregoing circulator modules SKYFR-000700 and MFR000xxx were tested in a setup similar to the setup described in reference to FIG. 11 under two frequency conditions. The first test condition was as follows: F1=925 MHz, +47 dBm, CW tone; F2=930 MHz, +47 dBm, CW tone. The second test condition was as follows: F1=955 MHz, +47 dBm, CW tone; F2=960 MHz, +47 dBm, CW tone.

Table 3 shows examples of results obtained from the foregoing IMD measurements.

TABLE 3

Figure 14A:
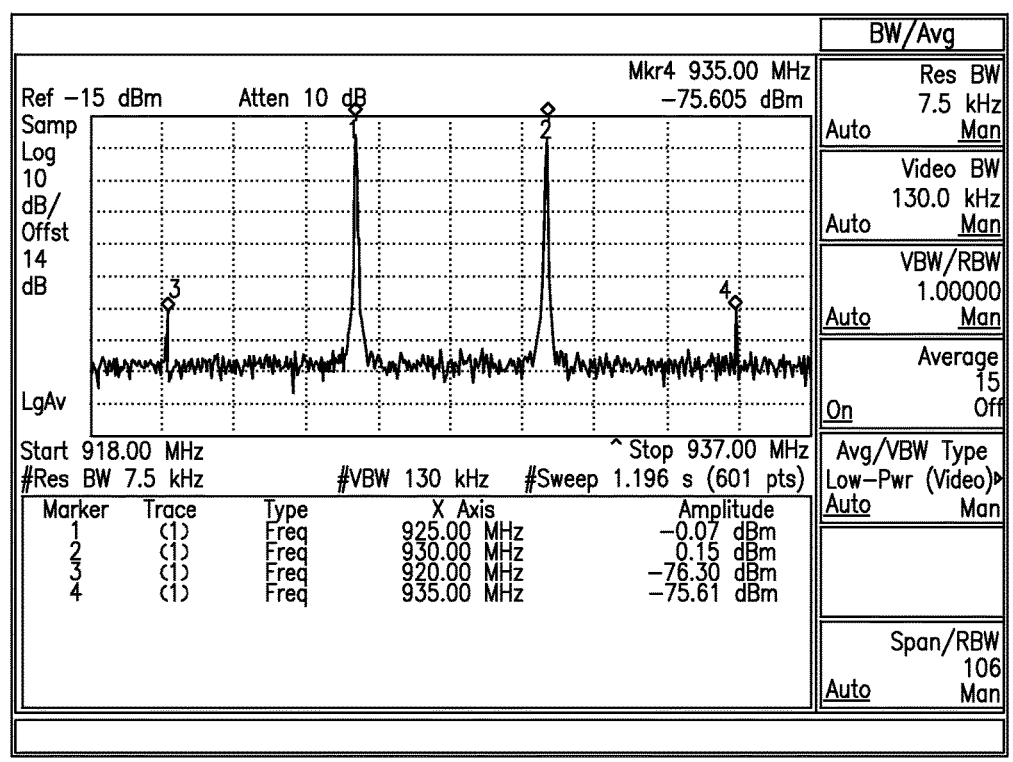
FIGS. 14A-14H show more detailed measurement results.
Figure 14B:
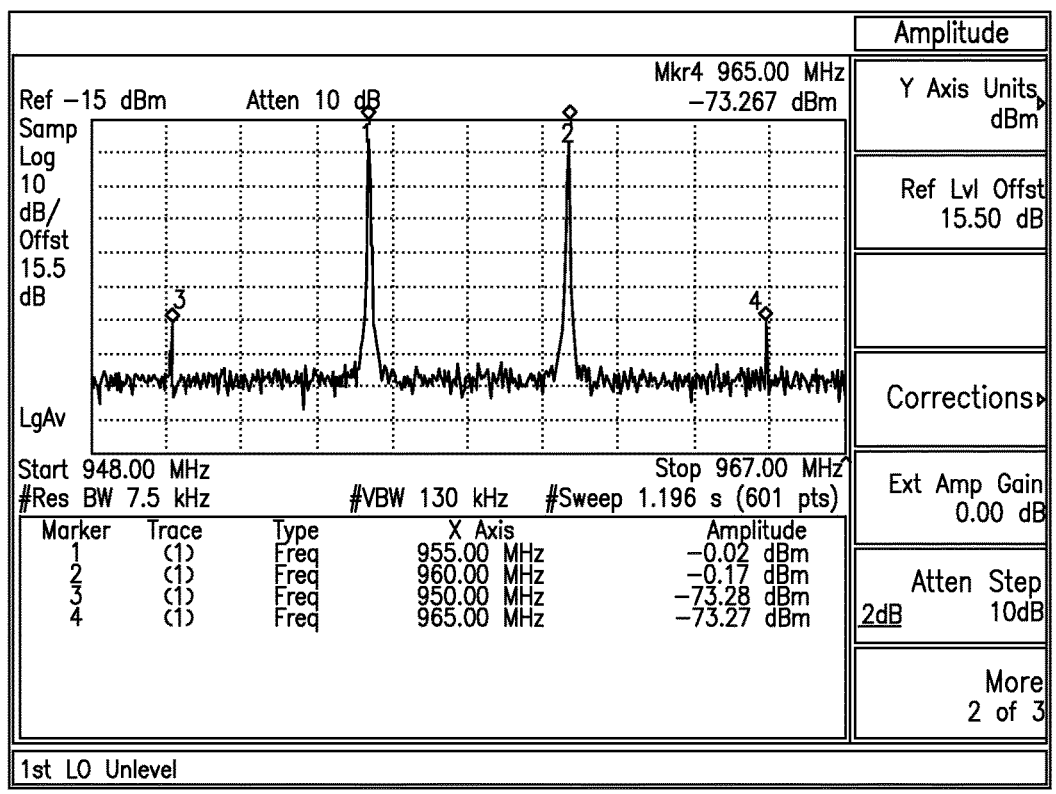
Figure 14C:
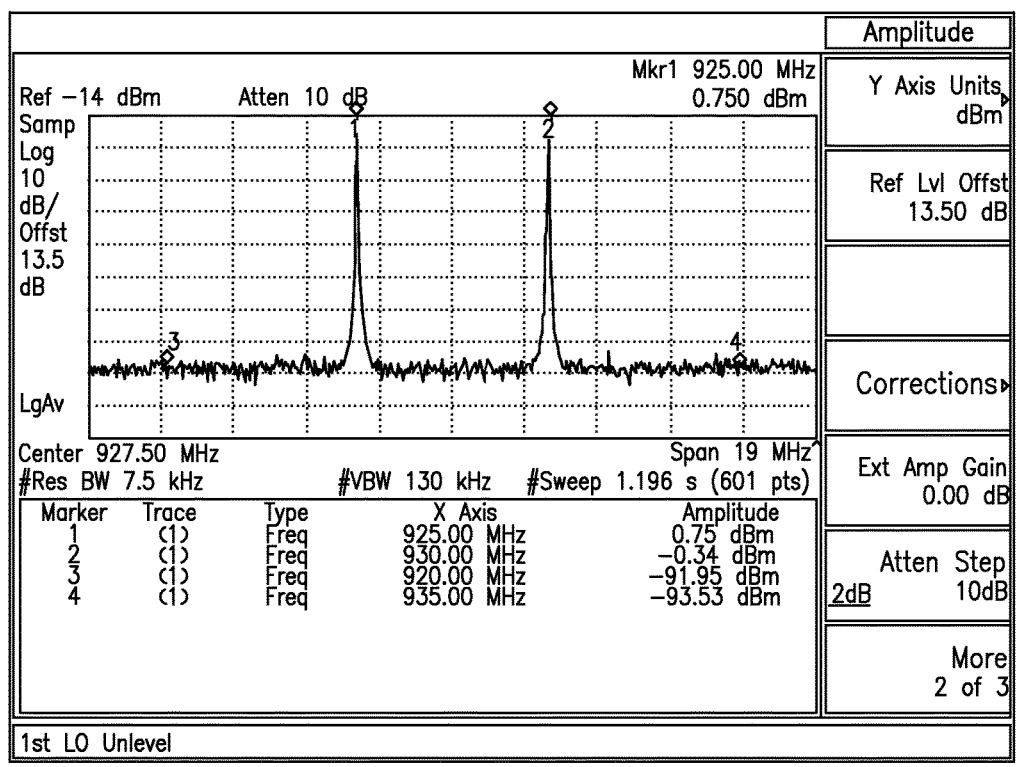
Figure 14D:
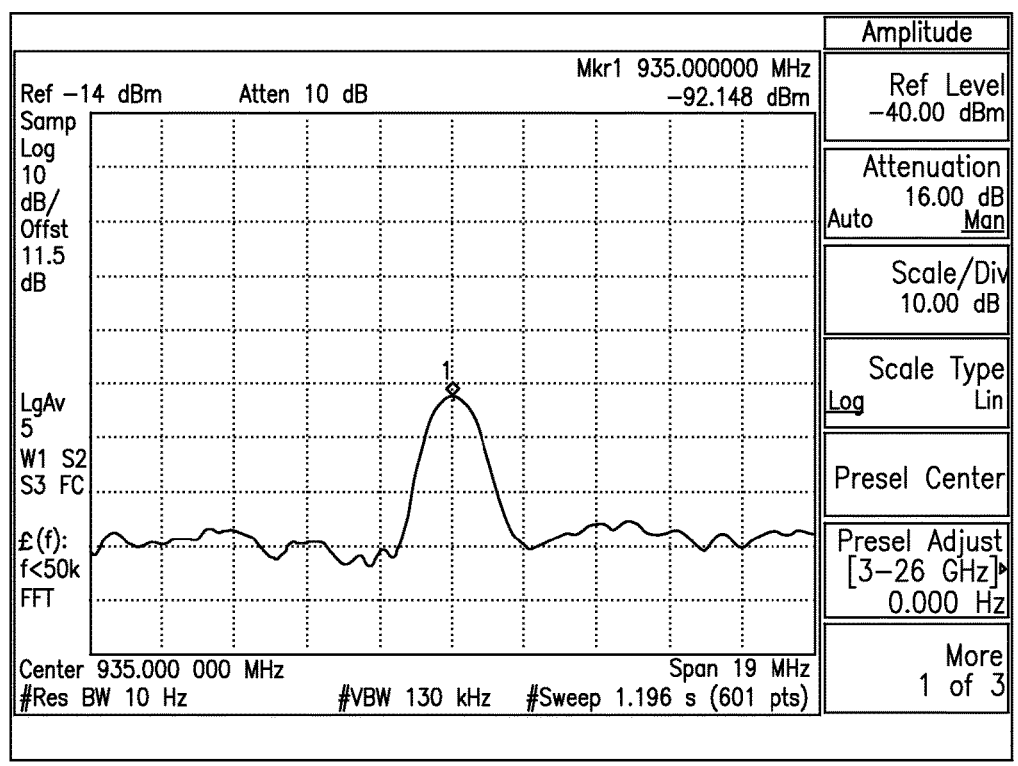
Figure 14E:
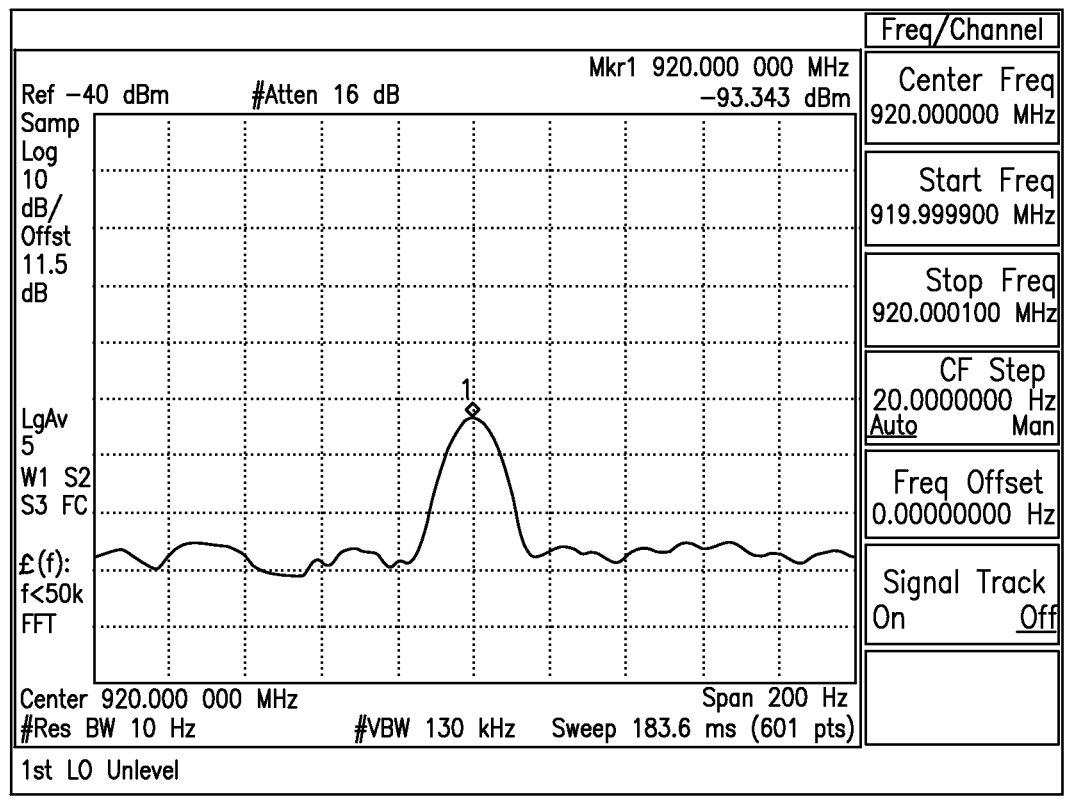
Figure 14F:
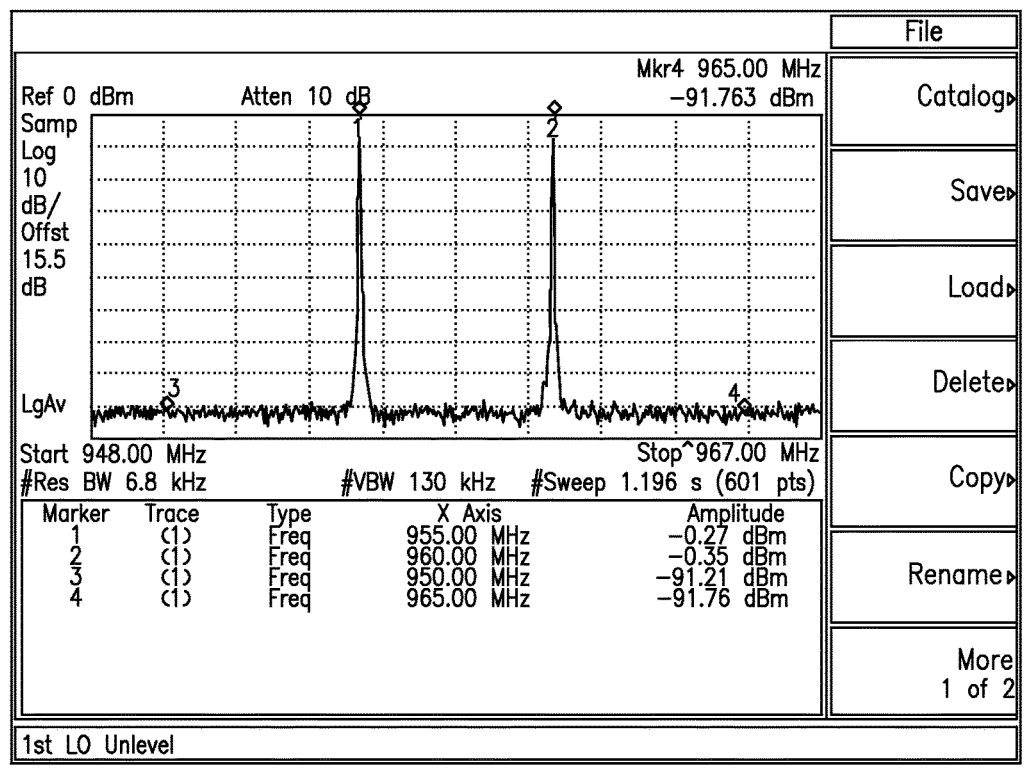
Figure 14G:
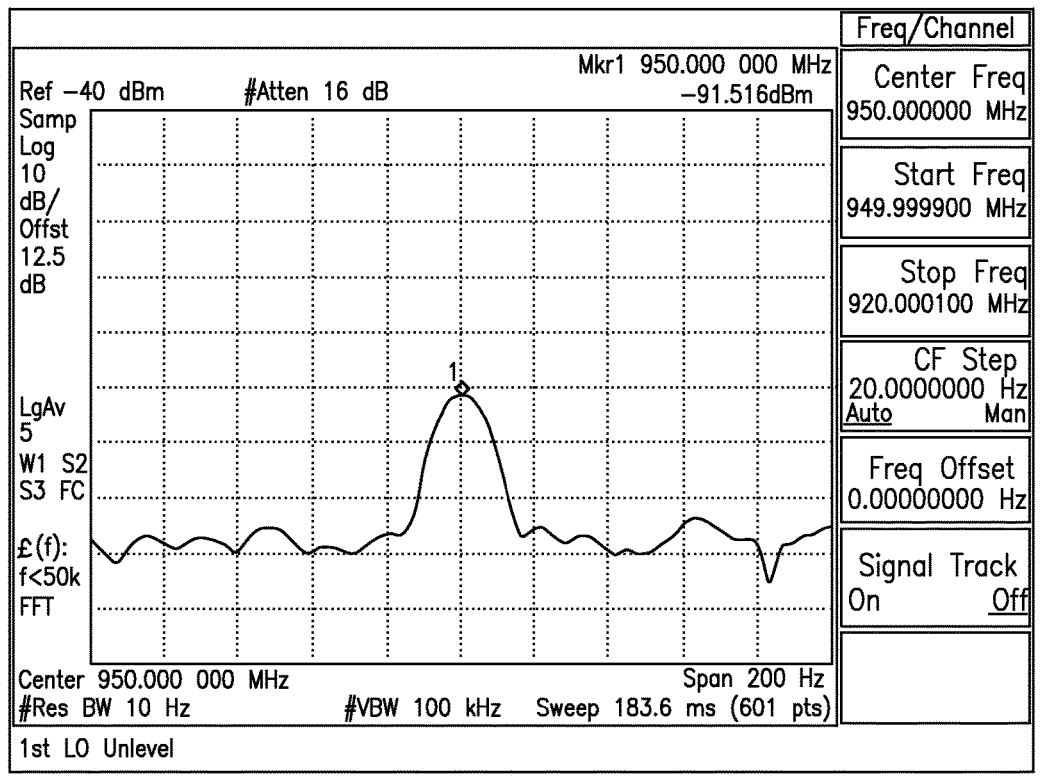
Figure 14H:
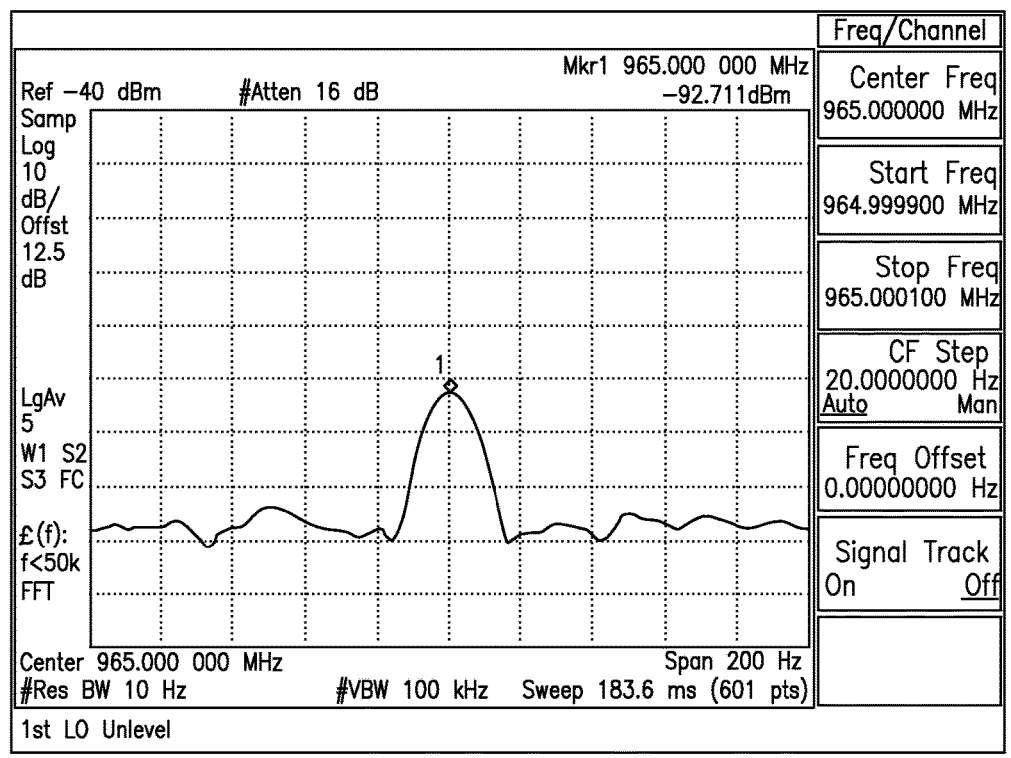

| Module | Approx. Frequency (MHz) | Approx. IMD (dBc) | See Figure(s) |
|---|---|---|---|
| MAFR-000xxx | 925 | −73 | FIG. 14A: MAFR-000xxx at 925 MHz |
| MAFR-000xxx | 960 | −73 | FIG. 14B: MAFR-000xxx at 955 MHz |
| SKYFR-000700 | 925 | −92 | FIG. 14C: SKYFR-000700 at 925 MHz<br>FIG. 14D: SKYFR-000700, close up of third order product at 935 MHz<br>FIG. 14E: SKYFR-000700, close up of third order product at 920 MHz |
| SKYFR-000700 | 960 | −91 | FIG. 14F: SKYFR-000700 at 955 MHz<br>FIG. 14G: SKYFR-000700, close up of third order product at 950 MHz<br>FIG. 14H: SKYFR-000700, close up of third order product at 965 MHz |

As one can see, IMD performance improvements of the SKYFR-000700 circulator module over the MAFR-000xxx device is more than 10 dB at all of the tested frequencies.

In the context of the carrier wave power as a reference, a circulator having one or more features of the present disclosure can be configured to provide a third-order IMD level of at least approximately −85 dBc, −86 dBc, −87 dBc, −88 dBc, −89 dBc, −90 dBc, −91 dBc, −92 dBc, −93 dBc, −94 dBc, −95 dBc, −96 dBc, or −97 dBc.

As described herein, one or more features of the present disclosure can be utilized to achieve improved IMD performance in the example GSM band. Such one or more features can also be utilized to achieve similar improvements in IMD performance in other GSM bands, other cellular band, and/or other non-cellular frequency ranges.

Figure 15:
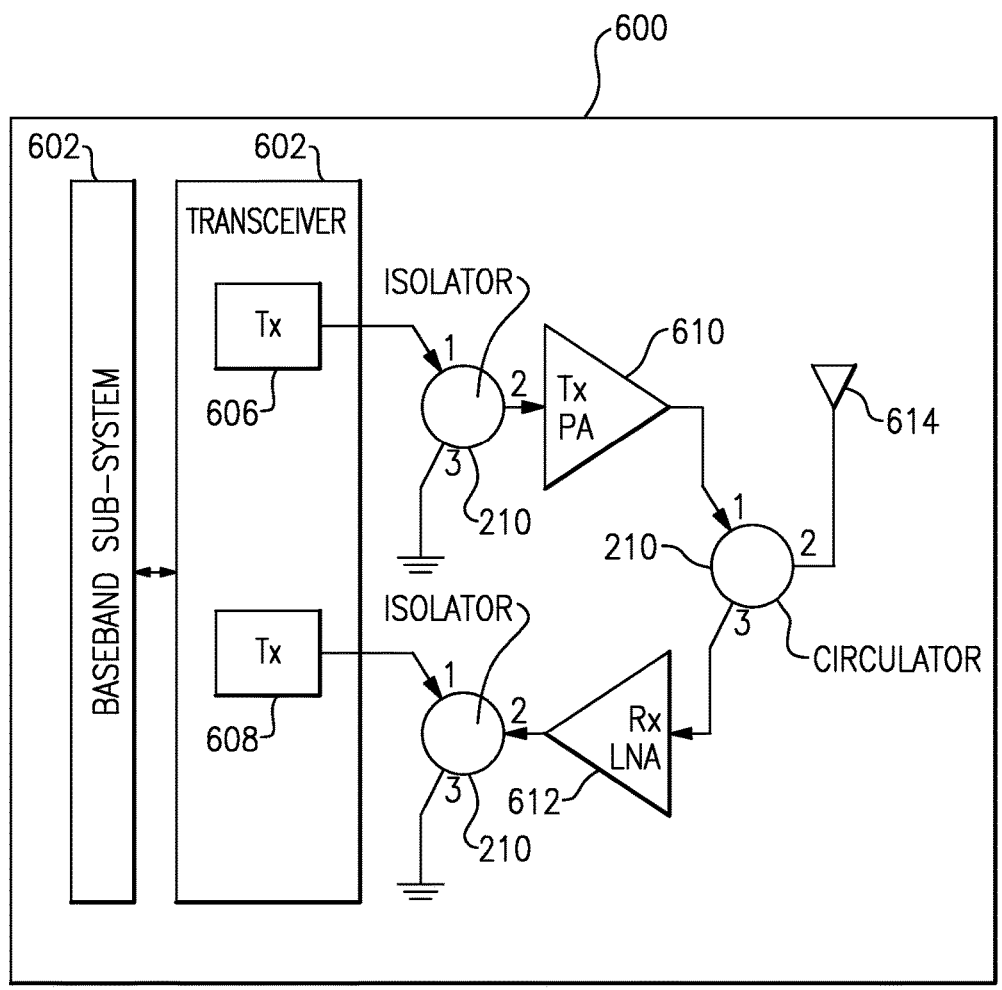
FIG. 15 schematically shows an example radio-frequency device where a circulator or an isolator having one or more features described herein can be implemented.

FIG. 15 shows that in some embodiments, one or more circulators or isolators described herein can be implemented in a radio-frequency (RF) device 600. The example RF device 600 can include a transceiver 604 having a transmitter 606 and a receiver 608. The transmitter 606 can be configured to generate an RF signal based on signals received from a baseband sub-system 602. The RF signal generated by the transmitter 606 is shown to be amplified by a power amplifier (PA) 610; and the amplified RF signal is shown to be sent to an antenna 614.

In the example RF device 600, the antenna 614 is shown to receive an incoming RF signal; and the received signal is routed to an low-noise amplifier (LNA) 612. The amplified received signal is then sent to the receiver 608 for processing; and the processed signal can be passed on to the baseband sub-system 602.

In the foregoing path between the transmitter 606 and the PA 610, an isolator 210 can be provided to isolate the to-be-amplified RF signal as it goes from port 1 to port 2. Such an isolation can be achieved by connecting port 3 to an appropriately configured termination path.

Similarly, in the foregoing path between the LNA 612 and the receiver 608, an isolator 210 can be provided to isolate the LNA-amplified signal as it goes from port 2 to port 1. Such an isolation can be achieved by connecting port 3 to an appropriately configured termination path.

In the foregoing example where the antenna 614 is shared for both transmit and receive operations, routing of the amplified signal (from the PA 610) and the received signal (to the LNA 612) can be facilitated by a circulator 210 as shown. In the example, port 2 is shown to be connected to the PA 610, port 2 is shown to be connected to the antenna 614, and port 3 is shown to be connected to the LNA 612. Thus, the amplified signal from the PA 610 enters port 1 of the circulator 210 and exits at port 2 to be routed to the antenna 614. The received signal from the antenna 614 enters port 2 of the circulator 210 and exits at port 3 to be routed to the LNA 612.

In some implementations, at least some of the isolators and/or the circulator of FIG. 15 can include one or more features as described herein to reduce IMD distortions. In some embodiments, the example circulator 210 can benefit especially due to the same device handling both transmit and receive signals thereby creating a condition susceptible to IMDs.

In some embodiments, the RF device 600 can include a wireless device. Such a wireless device can include a portable device, or a device configured for stationary systems such as a base station.

Figure 16A:
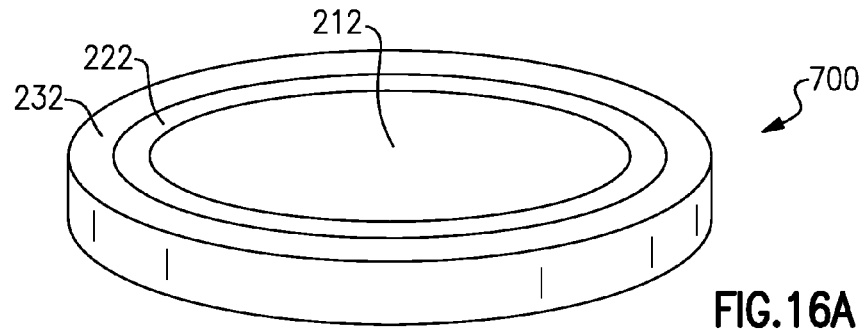
FIGS. 16A-16C show various views of an example ferrite-based disk having one or more features described herein, and how such a disk can be assembled.
Figure 16B:
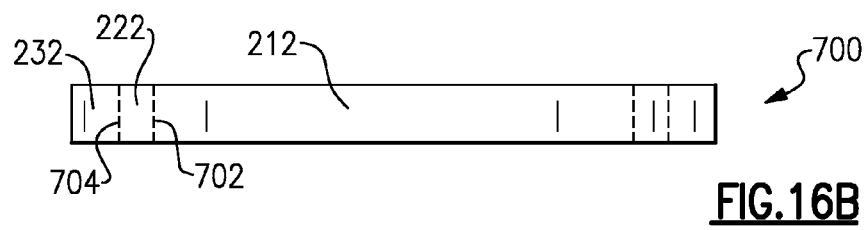
Figure 16C:
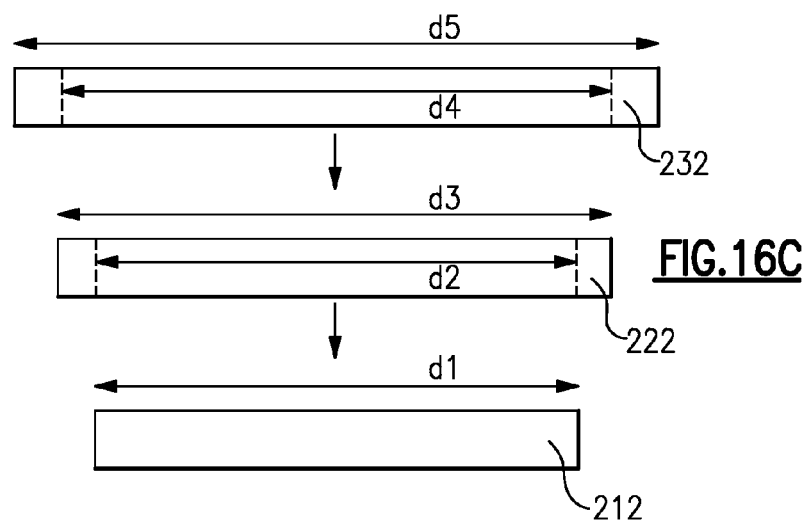

FIGS. 16A-16C show various views of an example ferrite-based disk having one or more features described herein, and how such a disk can be assembled. In an assembled form (FIGS. 16A and 16B), an example ferrite-based disk 700 is shown to include a ferrite center piece 212 which is surrounded by a ring 222 having a lower 4PiMs value than that of the ferrite center 212. The reduced 4PiMs ring 222 is shown to be surrounded by a dielectric ring 232. The disk 700 can be one of the two disks (212, 222, 232; and 214, 224, 234) described in reference to FIG. 9.

FIG. 16B shows that when assembled, the ferrite center 212 and the reduced 4PiMs ring 222 form a joint 702. Similarly, the reduced 4PiMs ring 222 and the dielectric ring 232 form a joint 704. Depending on how the pieces are assembled, such joints can be formed by, for example, an adhesive, shrink-fitting one part around another, and/or press-fitting.

FIG. 16C shows that the unassembled pieces 212, 222, 232 can be dimensioned appropriately to accommodate one or more assembly techniques. The ferrite center piece 212 is shown to have an overall diameter of d1. The reduced 4PiMs ring is shown to have an inner diameter of d2 and an outer diameter of d3. The dielectric ring is shown to have an inner diameter of d4 and an outer diameter of d5.

By way of examples, if the ferrite center piece 212 and the reduced 4PiMs ring 222 are to be press-fitted, then both can be sintered appropriately to yield desired physical properties and shrinkage, and then machined so that the dimensions d1 and d2 allow press-fitting. In another example, if the same pieces are to be assembled by an adhesive, the dimensions d1 and d2 can be selected to accommodate such an adhesive.

In yet another example, suppose that the dielectric ring 232 is to be shrunk-fit around an assembly of the reduced 4PiMs ring and the ferrite center (e.g., press-fit together with pre-shrunk pieces). The inner diameter dimension d4 of the dielectric ring 232 in its unfired condition can be selected to be larger than the outer diameter d3 of the reduced 4PiMs ring 222 in its fired condition, to allow the outer ring to slip over the inner ring. Then, firing of the assembly can shrink the outer ring (232) over the inner ring (222). Additional details concerning such "co-firing" methods can be found in U.S. Pat. No. 7,687,014, titled "CO-FIRING OF MAGNETIC AND DIELECTRIC MATERIALS FOR FABRICATING COMPOSITE ASSEMBLIES FOR CIRCULATORS AND ISOLATORS," which is hereby incorporated herein by reference in its entirety.

Figure 17:
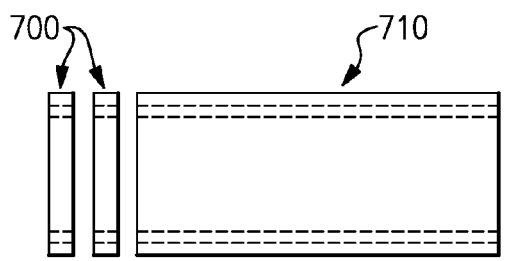
FIG. 17 shows that in some implementations, the ferrite-based disk of FIG. 16 can be obtained by cutting a plurality of pieces from a longer assembly.

FIG. 17 shows that in some implementations, the ferrite-based disk 700 of FIG. 16 can be obtained by first assembling longer pieces to yield a longer assembly 710. Then, a plurality of disks 700 can be cut from the longer assembly 710. Such cutting can be achieved in a number of known ways, and the cut disks 700 can be finished to yield, for example, desired finish and/or dimensions.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A passive circulator, comprising:
    a pair of ferrite plates, a center portion of each of the ferrite plates having a first saturation magnetization value and an edge portion of each of the ferrite plates having a second saturation magnetization value that is lower than the first saturation magnetization value;
    a pair of dielectric structures, each dielectric structure disposed along an outer perimeter of one of the ferrite plates;
    a pair of magnets that provide a static magnetic field to the ferrite plates to magnetize the ferrite plates, the ferrite plates disposed between the pair of magnets; and
    a housing that surrounds and encloses the pair of magnets, the pair of ferrite plates and the pair of dielectric structures, and which provides a return path for the magnetic field, the dielectric structures extending laterally from said outer perimeter of the ferrite plates to an inner surface of the housing.

2. The circulator of claim 1 further comprising an inner flux conductor disposed between the pair of ferrite plates and configured to provide resonator and matching network functionalities.

3. The circulator of claim 1 wherein a perimeter of each of the ferrite plates has a circular shape.

4. The circulator of claim 1 wherein a perimeter of each of the ferrite plates has a triangular shape.

5. The circulator of claim 1 wherein each of the ferrite plates is formed as a single piece disk.

6. The circulator of claim 1 further comprising first and second electrical conductors disposed relative to first and second locations so as to facilitate the transmission of the radio-frequency signal between the first and second locations.

7. The circulator of claim 6 wherein the pair of dielectric structures are configured to facilitate impedance matching between the first and second electrical conductors.

8. The circulator of claim 1 wherein each of the ferrite plates is a ferrite disk that includes a first piece having the first saturation magnetization value and a second piece having the second saturation magnetization value.

9. The circulator of claim 8 wherein the second piece of the ferrite disk forms a ring about the first piece.

10. A passive circulator module for isolating transmit and receive radio-frequency signals from each other, the module comprising:
    a pair of ferrite plates each defining a center portion and an edge portion, the center portion having a first saturation magnetization value and the edge portion having a second saturation magnetization value that is less than the first saturation magnetization value;
    a pair of dielectric rings, each dielectric ring disposed along an outer perimeter of the edge portion of one of the ferrite plates;
    a pair of magnets that provide a static magnetic field to the ferrite plates to magnetize the ferrite plates, the ferrite plates disposed between the pair of magnets;
    a housing that surrounds and encloses the pair of magnets, the pair of ferrite plates and the pair of dielectric rings, and which provides a return path for the magnetic field, the dielectric rings extending laterally from said edge portions of the ferrite plates to an inner surface of the housing; and
    signal ports coupled to a transmit radio-frequency signal, a receive radio-frequency signal, and an antenna.

11. The module of claim 10 wherein the housing comprises a plurality of separate pieces.

12. The module of claim 10 wherein each of the ferrite plates is formed as a single piece disk.

13. The module of claim 10 wherein each of the ferrite plates includes a circular disk having a first radius that defines the center portion, and a circular ring that defines the edge portion, the circular ring having an inner diameter greater than or equal to the first radius and an outer diameter at an outer edge of the ferrite plate.

14. A wireless device, comprising:
    a transmitter circuit;
    a receiver circuit;
    an antenna configured to transmit signals from the transmitter circuit and to receive signals for the receiver circuit; and
    a passive circulator for isolating transmit and receive signals between the transmitter and receiver circuits, including (a) a pair of ferrite plates each defining a center portion having a first saturation magnetization value and an edge portion having a second saturation magnetization value that is lower than the first saturation magnetization value; (b) a pair of dielectric structures, each dielectric structure disposed along an outer perimeter of one of the ferrite plates; (c) a pair of magnets that provide a static magnetic field to the ferrite plates to magnetize the ferrite plates, the ferrite plates disposed between the pair of magnets; (d) a housing that surrounds and encloses the pair of magnets, the pair of ferrite plates and the pair of dielectric structures, and which provides a return path for the magnetic field, the dielectric structures extending laterally from said outer perimeter of the ferrite plates to an inner surface of the housing; and (e) signal ports coupled to the transmitter circuit, the receiver circuit, and the antenna.

15. The wireless device of claim 14 wherein the wireless device includes a base station.

16. A method for reducing intermodulation distortion, the method comprising:
    providing a pair of ferrite plates having a ferrite medium, the ferrite plates having a center portion with a first saturation magnetization to allow passage of a transmit signal between first and second locations of the ferrite medium and passage of a receive signal between the second and a third location of the ferrite medium, the pair of ferrite plates having an edge portion with a second saturation magnetization that is lower than the first saturation magnetization to reduce intermodulation distortion occurring at the edge portion of the ferrite plates;
    disposing a pair of dielectric structures along an outer perimeter of the ferrite plates;
    applying a static magnetic field to the pair of ferrite plates with a pair of magnets, the pair of ferrite plates disposed between the pair of magnets; and
    providing a return path for the magnetic field with a housing that surrounds and encloses the pair of ferrite plates, the pair of dielectric structures and the pair of magnets, the dielectric structures extending laterally from said outer perimeter of the ferrite plates to an inner surface of the housing.

17. The method of claim 16 wherein the second saturation magnetization of the edge portion reduces a third order product of fundamentals of the transmit and receive signals to a level of at least about −85 dBc.

18. The method of claim 17 wherein the reduction of the third order product is to a level of at least about −90 dBc.

* * * * *